United States Patent [19]

Berkowitz et al.

[11] 4,198,307

[45] Apr. 15, 1980

[54] POLYMER BASED MAGNETIC TAGS

[75] Inventors: Ami E. Berkowitz; Fred F. Holub, both of Schenectady, N.Y.

[73] Assignee: General Electric Company, Schenectady, N.Y.

[21] Appl. No.: 927,383

[22] Filed: Jul. 24, 1978

[51] Int. Cl.² ........................ C09K 3/00; C06B 45/04; H01F 1/00

[52] U.S. Cl. ........................ 252/62.54; 149/2; 149/21; 252/62.52; 252/62.53; 252/301.33

[58] Field of Search ..................... 149/2 T; 252/62.53, 252/62.54

[56] References Cited

U.S. PATENT DOCUMENTS

| | | | |
|---|---|---|---|
| 2,601,212 | 6/1952 | Polydoroff | 252/62.54 X |
| 3,736,500 | 5/1973 | Berkowitz | 324/34 R |
| 3,772,099 | 11/1973 | Ryan et al. | 149/18 |
| 3,861,886 | 1/1975 | Meloy | 44/51 |
| 3,967,990 | 7/1976 | Ryan et al. | 149/109.4 |
| 4,053,433 | 10/1977 | Lee | 252/408 |
| 4,115,534 | 9/1978 | Ithakissios | 424/1 |
| 4,131,064 | 12/1978 | Ryan et al. | 102/1 R |

*Primary Examiner*—F. C. Edmundson

*Attorney, Agent, or Firm*—Lawrence D. Cutter; James C. Davis; Marvin Snyder

[57] ABSTRACT

Ferrite particles having a plurality of distinct Curie temperatures are encapsulated within a polymer matrix to provide tagging material especially useful in identifying explosive materials even after detonation. In one embodiment, phosphor is dispersed within the polymer matrix to facilitate collection of tag particles following detonation. The tags are also usable in tagging other articles, especially where harsh environmental conditions are likely to be encountered.

12 Claims, 2 Drawing Figures

POLYMER BASED MAGNETIC TAGS

BACKGROUND OF THE INVENTION

This invention relates to magnetic tags, and more specifically to magnetic tags commprising polymer encapsulated ferrite particles which are particularly useful in identifying explosives even after detonation.

Police and other investigative authorities have long been hampered in their investigations of bombing incidents by the inability to quickly and accurately determine the source of the explosive compound employed. A method to identify the explosive employed as to manufacturer, type of explosive, date of manufacture, and even the shift of manufacture would be very useful in tracing the explosive compound to its ultimate criminal user. Additionally, it is useful to identify explosive compounds used in certain mining operations to determine whether a permissible explosive compound was employed.

Such a tag for an explosive must satisfy certain requirements. First, the tag must not sensitize the explosive material, that is, the tag must not render the explosive material susceptible to premature or accidental detonation. Second, the tag must not be adversely affected by contact with the components of the explosive. Third, the tag must be able to survive exposure to the elements over prolonged periods of time without significant degradation. Fourth, the tag must be resistant to the heat and pressure of explosion. Fifth, the tag must be readily recoverable after detonation. Sixth, the procedure to identify the tag should be readily performable.

Prior art solutions to this problem have consisted of two basic approaches. The first approach employs plastic flakes approximately 0.04 millimeters wide, with each flake comprising seven colored layers with colors that are repeatable except in adjacent layers. With ten colors thus employed in seven layers, there are approximately 300 million possible color combinations (tag codes). However, these flakes have low probability of survival when employed in high energy explosives such as gelatin dynamite, boosters, and certain two-component explosives. The second approach employs ferrites having distinct Curie temperatures coated with potassium silicate or sodium silicate. However, in this latter approach, the bonding of the coating to the ferrite is weak, the coating has a tendency to deteriorate in air and the exterior of the silicate coated particles is not sufficiently smooth for use in tagging explosives. Both of these prior art tagging approaches utilize a phosphor to facilitate post-detonation detection and retrieval of the tag particles. Nevertheless, both of these approaches exhibit undesirable survival characteristics.

SUMMARY OF THE INVENTION

In accordance with a preferred embodiment of the present invention, ferrite particles are dispersed within a polymer matrix which also contains phosphor particles dispersed therein for ease of post-detonation collection. The ferrite particles are selecteed to have particular Curie temperatures. These magnetic tags are employed as a tagging system in which a plurality of distinct Curie temperatures define a particular tag code. Polymer particles containing ferrite and phosphor particles are disposed within or on a substance to be identified. In accordance with another embodiment of the present invention, ferrite particles are coated with polymer without phosphor. This latter embodiment relies more heavily on post-detonation collection by attractive magnetic means.

Also disclosed are two methods for the manufacture of magnetic tags. In a first preferred method, a mixture of polymer, phosphor, ferrite, and suitable solvent is spray dried to produce smooth, spheroidal tag particles. In a second preferred method, a solid, fused mixture of ferrite, phosphor, and polymer is ground into a powder, for example, by ball milling. The powder is then heated in a fluid bed to form spheroidal tag particles.

The magnetic tags described above may also be coated with an adhesive material so that the tags may be affixed to substances to be tagged other than explosives.

Accordingly, it is the object of the present invention to provide magnetic tagging materials which are readily collectible and identifiable even under the severest of environmental conditions. It is a further object of the present invention to provide magnetic tagging materials for explosive materials which do not increase the proclivity for accidental detonation and which are capable of surviving detonation.

DETAILED DESCRIPTION OF THE INVENTION

Figure 1:
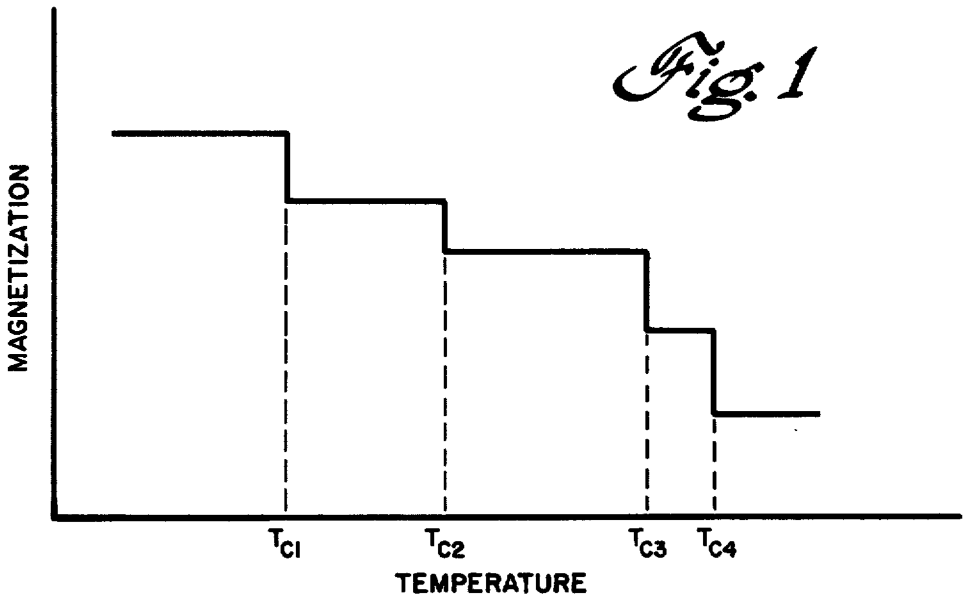
FIG. 1 is a graph of magnetization versus temperature for tagging material comprising ferrites having four distinct Curie temperatures.

FIG. 1 illustrates the concept underlying magnetic tagging. FIG. 1 is a graph of magnetization versus temperature for a sample magnetic tag comprising a plurality of ferrites with four distinct Curie temperatures, $T_{C1}$, $T_{C2}$, $T_{C3}$, and $T_{C4}$. As the sample of material is heated, the magnetization is observed to decrease at certain temperatures. The transition is not necessarily as precipitous as FIG. 1 might imply for the scales chosen. The decrease in magnetization is, in actuality, relatively smooth but the transitions in FIG. 1 are depicted as sharp for reasons of scale and ease of understanding. Nonetheless, by observing the curve at points of inflection, the Curie temperatures present in the tag are readily discernible. Moreover, the determination of Curie temperature is a repeatable measurement which can be taken as often as desired as long as the ferrite is not heated to temperatures at which the structure or composition are changed. As long as the heating is controlled, measurement of the Curie temperature of even a single ferrite particle of sufficient size is possible.

In a limited number of applications, a tag exhibiting only a single Curie temperature may be required. However, the tagging system of the present invention typically employs tags exhibiting a plurality of Curie temperatures. As discussed below, ferrite materials exhibiting Curie temperatures from room temperature to temperatures in excess of 500° C. are usable. In this temperature range, as many as forty or fifty ferrites, each possessing a distinct Curie temperature, may be employed. For example, if there are fifty such Curie temperatures to choose from, and any five of these are chosen to form a particular tag, then a total of 2,118,760 distinct tag codes are possible. If desired, this number may be increased by increasing the number of distinct Curie temperatures selected. The use of ferrites with up to approximately fifty distinct Curie temperatures is accomplished by employing an average resolution of approximately 10° C. between adjacent Curie temperatures. This resolution is well within the capabilities of existing measuring instruments. If desired, the resolution may be changed to 15° C. between adjacent Curie temperatures at the cost of lowering the number of usable tag codes.

Figure 2:
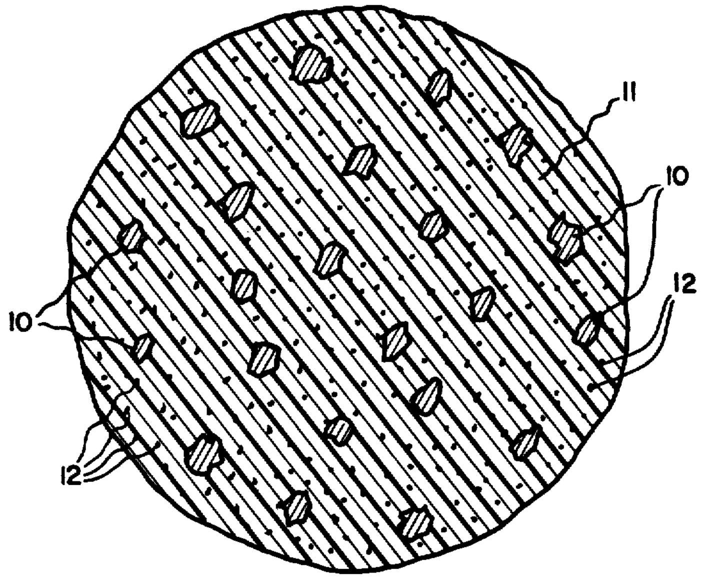
FIG. 2 is a cross sectional view of a tag particle in accordance with a preferred embodiment of the present invention.

FIG. 2 illustrates a preferred embodiment of the present invention in which ferrite particles 10, exhibiting at least one Curie temperature, are dispersed within polymer matrix 11 which also contains phosphor particles 12. The ferrite particle is typically between 1 and 10 microns in width while the tag particle itself is typically between 100 and 5,000 microns in diameter. Ferrite particles themselves, however, are not satisfactory for use in explosive tagging because of the tendency of irregularly shaped ferrite particles to sensitize explosive compounds. This problem is solved by encapsulating the ferrite particles in a polymer matrix 11.

The polymer matrix serves several purposes. First, it produces particles with smooth, spheroidal surfaces. Second, it greatly enhances the ability of the ferrite to withstand the temperature and pressure of the detonation. Third, the polymer matrix serves as a medium for containing phosphor material which aids in post-detonation collection of the tag particles.

In another embodiment, ferrite particle 10 are dispersed with in polymer matrix 11 without any phosphor added. In this embodiment, post-detonation collection is accomplished by employing attractive magnetic means.

The ferrites employed may be any ferrite material exhibiting a relatively sharp magnetization drop at its Curie temperature. For example, nickel zinc ferrites ($Ni_xZn_{1.0-x}Fe_2O_4$) and cobalt zinc ferrites ($Co_xZn_{1.0-x}Fe_2O_4$) (where $0<x<1$) may be employed. Nickel zinc ferrites exhibit Curie temperatures ranging from below 0° C. to approximately 595° C. Virtually, any Curie temperature within this range is obtained by carefully varying the concentration of the nickel and zinc, with increases in nickel content and corresponding decreases in the zinc content resulting in the formation of ferrites with higher Curie temperatures. Likewise, cobalt-zinc ferrites which exhibit Curie temperatures ranging from below 0° C. to approximately 520° C. may also advantageously be employed. Increases in the concentration of cobalt with corresponding decreases in the zinc concentration also result in ferrites with increased Curie temperatures.

Alloys and commpounds other than ferrites may also be used as long as they exhibit sufficiently distinct Curie temperatures and are relatively stable. Ferrites are particularly advantageous in this regard and also exhibit relatively high magnetization.

The phosphor employed is not critical but an ultraviolet sensitive phosphor is preferred. However, sufficient amounts of phosphor should survive the temperature and pressure of the detonation to permit visual recovery of the tags upon excitation by ultraviolet light. Two phosphors that are particularly useful in this regard are zinc silicate doped with manganese ($Zn_2SiO_4$:Mn) which fluoresces green upon exposure to ultraviolet light. Another useful phosphor is yttrium vanadate doped with europium ($YVO_4$:Eu) which fluoresces red upon exposure to ultraviolet light.

The choice of a polymer is however important. The polymer must be thermally stable and be able to survive detonation if incorporation into explosive compounds is required. These requirements are met, for example, by curable organopolysiloxane resin. The polysiloxane resin may also be combined with fumed silica so that even if the polymer is oxidized by the heat of an explosion, a skeleton of silica remains surrounding the tag.

A magnetic tag such as that shown in FIG. 2 is easily manufactured in a spray drying process. In this process, a mixture of ferrite particles, phosphor, polymer, and suitable solvent, such as alcohol, toluene, or xylene, is spray dried into a heated spray dry chamber from which the resulting spheroidal, polymer coated ferrite particles may be removed.

Another method is also employable in the manufacture of polymer based magnetic tags. A solid fused mixture of ferrite, polymer, and, if desired, phosphor, is ground into a powder. This powder is then heated in a fluid bed to form spheroidal tag particles.

While a wide range of tag particle sizes is producible, a magnetic tag particle diameter of between approximately 100 and approximately 5,000 microns is most advantageous for use of these tags in explosive materials. It is to be noted, however, these tags have other uses than tagging explosives. In particular, the polymer coating provides a protective, highly compressible barrier to protect the ferrite material under a variety of extremely harsh environmental conditions including exposure to heat, pressure, and many deleterious chemical compounds. In particular, along with an appropriate adhesive binder, these magnetic tags may be employed to identify and trace various products of manufacture.

Each ferrite particle employed possesses its own single, unique Curie temperature and each tag particle exhibits all the Curie temperatures for a particular tag code. However, tagging systems employing tag particles exhibiting only a single Curie temperature are possible as long as tag particles exhibiting all the Curie temperatures of the desired tag code are selectively blended.

Magnetic tags produced in accordance with the invention herein have been tested by mixing the tag with dynamite and exploding the mixture in a three-foot diameter steel vessel. Prior to each test the vessel was thoroughly cleaned and as much rust and scale as possible was removed. In the first test, approximately 2.3 grams of a yellow phosphor (No. 113-3-178 as supplied by the General Electric Lamp Metals and Components Department, Cleveland, Ohio) magnetic tag was mixed in a plastic bag with one-half pound of Dupont Gelex ® dynamite and formed into a ball and a blasting cap. The magnetic tag was formed from 10 grams of a mixture of ferrites, 5.1 grams of a 50 percent butanol solution of a curable polysiloxane resin and the yellow phosphor all heated to 220° C. and maintained thereat for one-half hour, cooled, and then crushed. Following the explosion which was entirely contained in the steel vessel, residue was collected using a whisk broom and dust pan and also using a vacuum cleaner with a filter bag. The residue was successfully examined and the two Curie temperatures present in the tag were determined and found to be accurate. Similar results were obtained using 2.3 grams of a magnetic tag containing red phosphor ($YVO_4$:Eu) formed by combining 10 grams of a mixture of ferrites, 10 grams of the phosphor, and 5.1 grams of a 50 percent xylene solution of curable polysiloxane resin containing a catalyst of 0.02 grams of 18 percent zinc octoate. The mixture was heated to 250° C. for one-half hour, cooled and crushed to a powder. Again, the two Curie temperatures present were determined following detonation of the one-half pound of Gelex ® with which the tag was mixed.

The containment of the explosion within the relatively small volume of the steel vessel produces shock in excess of what would normally be encountered in a terrorist explosion. In addition, since the sphere was steel, much of the residue was magnetic, making separation difficult. Nonetheless, even under these severe conditions, magnetic tags were collected and identified.

From the above, it may be appreciated that the embodiments of the present invention provide a rugged magnetic tag capable of surviving explosive detonations. Furthermore, this tag is easily collected after the explosion and may be quickly identified. It can be further appreciated from the disclosures herein, that the magnetic tags are easily and inexpensively manufacturable. Thus, the present invention provides a significant aid to law enforcement agencies charged with investigations of bombing incidents and other explosives related crimes. The present invention also provides extremely rugged identification means for a variety of other products.

While this invention has been described with reference to particular embodiments and examples, other modifications and variations will occur to those skilled in the art in view of the above teachings. Accordingly, it should be understood that the appended claims are intended to cover all such modifications and variations as fall within the true spirit of the invention.

The invention claimed is:

1. A magnetic tag for identification comprising:

a plurality of magnetic particles, collectively exhibiting at least one Curie temperature, said magnetic particles being disposed within a polymer matrix particle having a relatively smooth exterior surface.

2. The tag of claim 1 in which the polymer matrix contains a phosphor.

3. The tag of claim 2 in which the phosphor is yttrium vanadate doped with europium.

4. The tag of claim 2 in which the phosphor is zinc silicate doped with manganese.

5. The tag of claim 1 in which the polymer is a curable polysiloxane resin.

6. The tag of claim 1 in which the polymer is a curable copolymer of polysiloxane resin.

7. The tag of claim 1 in which the polymer particles are between approximately 100 microns and 5,000 microns in diameter.

8. The magnetic tag of claim 1 further comprising an adhesive coating for attachment of the tag to a product to be identified.

9. The magnetic tag of claim 1 in which said polymer matrix includes fumed silica.

10. The magnetic tag of claim 1 in which the magnetic particles comprise ferrite particles.

11. The tagging system of claim 10 in which the ferrite particles are composed of material selected from the group consisting of nickel-zinc ferrites and cobalt-zinc ferrites.

12. A magnetic tag for identification comprising:

a mixture of polymer matrix particles with ferrite particles disposed therein, each individual polymer matrix particle exhibiting a single Curie temperature, said mixture exhibiting a plurality of distinct Curie temperatures.

* * * * *